United States Patent [19]

Dumschat et al.

[11] Patent Number: 5,113,716
[45] Date of Patent: May 19, 1992

[54] RELEASABLE LOCKING DEVICE FOR A VEHICLE STEERING COLUMN ADJUSTABLE IN THE LONGITUDINAL DIRECTION

[75] Inventors: Rainer Dumschat, Donzdorf; Gottfried Schremmer, Tamm, both of Fed. Rep. of Germany

[73] Assignee: Mercedes-Benz AG, Fed. Rep. of Germany

[21] Appl. No.: 599,515

[22] Filed: Oct. 18, 1990

[51] Int. Cl.⁵ .............................................. B62D 1/18
[52] U.S. Cl. ...................................... 74/493; 280/775
[58] Field of Search ................... 74/493; 280/775, 777

[56] References Cited

U.S. PATENT DOCUMENTS

| | | | |
|---|---|---|---|
| 1,623,493 | 4/1927 | Postlethwait | 74/493 |
| 2,549,345 | 4/1951 | Tamboli | 74/493 |
| 2,639,626 | 5/1953 | Snyder | 74/493 |
| 2,716,355 | 8/1955 | Schmid | 74/493 |
| 4,337,967 | 7/1982 | Yoshida et al. | 74/493 X |

FOREIGN PATENT DOCUMENTS

| | | |
|---|---|---|
| 0317791 | 10/1988 | European Pat. Off. . |
| 2417543 | 10/1975 | Fed. Rep. of Germany . |
| 8812673 | 1/1989 | Fed. Rep. of Germany . |
| 264894 | 2/1989 | Fed. Rep. of Germany . |

OTHER PUBLICATIONS

International Application Published under the PCT-International Publication No. WO80/01478.

Primary Examiner—Allan D. Herrmann
Assistant Examiner—David W. Laub
Attorney, Agent, or Firm—Evenson, Wands, Edwards, Lenahan & McKeown

[57] ABSTRACT

A releasable locking device for a vehicle steering column adjustable in the longitudinal direction is disclosed which has a postionally fixed steering column part and a steering column section displaceable relative to the latter. A steering wheel is provided at the end of the steering column. The fixing of the steering column can be influenced by a hydraulic system which can be controlled by a mechanical actuating member. A locking device is provided which has a sealed hydraulic piston-cylinder unit which is arranged axially parallel to the steering column and is coupled between the positionally fixed steering column part and the displaceable steering column section with the cylinder chamber subjected to pressure in the case of an impact on the steering wheel being completely filled. The relative position of the fixed steering column part and the displaceable steering column section can be locked in various supporting positions by a blocking device arranged in an overflow path between the two sealed cylinder chambers.

5 Claims, 1 Drawing Sheet

RELEASABLE LOCKING DEVICE FOR A VEHICLE STEERING COLUMN ADJUSTABLE IN THE LONGITUDINAL DIRECTION

BACKGROUND AND SUMMARY OF THE INVENTION

The invention relates to a releasable locking device for a vehicle steering column adjustable in the longitudinal direction, having a positionally fixed steering column part and a steering column section displaceable relative to the latter, having at the end a steering wheel, the fixing of which can be performed by a hydraulic piston-cylinder unit which is arranged axially parallel to the steering column and is coupled between a positionally fixed steering column part and a displaceable steering column section and which can be controlled by a mechanical actuating member.

PTC Patent Document WO 80/01478 describes a locking device for an adjustable vehicle steering column in which a piston-cylinder unit is coupled by in each case one end to two steering column parts which, when this piston-cylinder unit is pressurized, can be pushed apart. The piston-cylinder unit is actuated by the oil flow from a feed line and controlled via an operator-controllable valve. In the case of these pressure connections, which are necessary at both ends, the oil pressure must be maintained even after the locking position of the steering column has been reached.

A locking device which comprises a hydraulically pressurized piston is known from a device for steering-wheel adjustment in motor vehicles and described in German Utility Model 8,812,673. Here, an otherwise unpressurized piston is pressurized via a hydraulic fluid for the purpose of releasing clamping of the steering column, the piston thereby acting against the clamping force of Belleville springs. The clamping force for locking the displaceable steering column part is here produced exclusively by the Belleville springs, which clamp two half-shells of a guiding body to the steering column part. It is impossible for displacement-proof fixing of the steering column in the case of an impact on the steering wheel to result from this non-rigid, frictional clamping. If the clamping of the steering column is released by actuation of the mechanical actuating lever and by the pressure brought about thereby of the hydraulically pressurized piston on the Belleville springs, the steering column is freely displaceable in the guiding body and, by reason of its weight and that of the steering Wheel, will tend to slide downwards unbraked in the guiding body.

A piston-cylinder unit in a safety steering column which absorbs the impact energy coming into effect in the event of a collision is known in German Laid Open Application No. 2,417,543. For this purpose, the steering part is guided in axially displaceable fashion in a chamber in the steering column, said chamber containing an incompressible medium. Connected downstream of this chamber, via a flow passage, is a further chamber in which is arranged a controllable flow valve.

An object on which the invention is based is to design a locking device for a vehicle steering column vertically adjustable in the longitudinal direction in such a way that it is stable under impact and favorable in terms of operation.

The object is achieved according to the invention by providing an arrangement wherein the locking device has a sealed piston-cylinder unit which, with the cylinder chamber completely filled and subjected to pressure in the case of an impact on the steering wheel, can be locked in its various supporting positions by a blocking device arranged in the overflow path between the two cylinder chambers.

After the opening of the blocking device, the sealed hydraulic piston-cylinder unit arranged axially parallel to the steering column permits a stepless adjustment of the displaceable steering column section while, with the passage through its hydraulically closed system with the cylinder closed, it is completely rigid. This leads to the steering column in this zone consistently passing the impact forces which act on the steering wheel in the support structure. Complete filling with fluid of the cylinder chamber subjected to pressure in the case of an impact on the steering wheel can be achieved in a simple manner if both cylinder chambers correspond in the volume of fluid displaced and accepted, as results, for example, in the case of a piston rod on both sides. A rebound energy against a person bracing himself against the steering wheel in the case of an accident, such as that which could be produced, for example, in the case of a gas-filled spring device used for positioning the steering column, is not to be expected at all. The adjustment of the steering wheel in the axial direction of the steering column is thus made possible in a simple fashion mechanically by the actuation of the blocking device, but the displaceable steering column section does not sink downwards due to the damping caused by the limited cross-section of flow of a valve but can be pulled upwards or pressed downwards with slight resistance by the fluid flowing through the valve opening. A limitation of the displacement movement of the steering column section can here be brought about by providing limitation of the piston displacement in the cylinder.

Other objects, advantages and novel features of the present invention will become apparent from the following detailed description of the invention when considered in conjunction with the accompanying drawings.

DETAILED DESCRIPTION OF THE DRAWINGS

Figure 1:
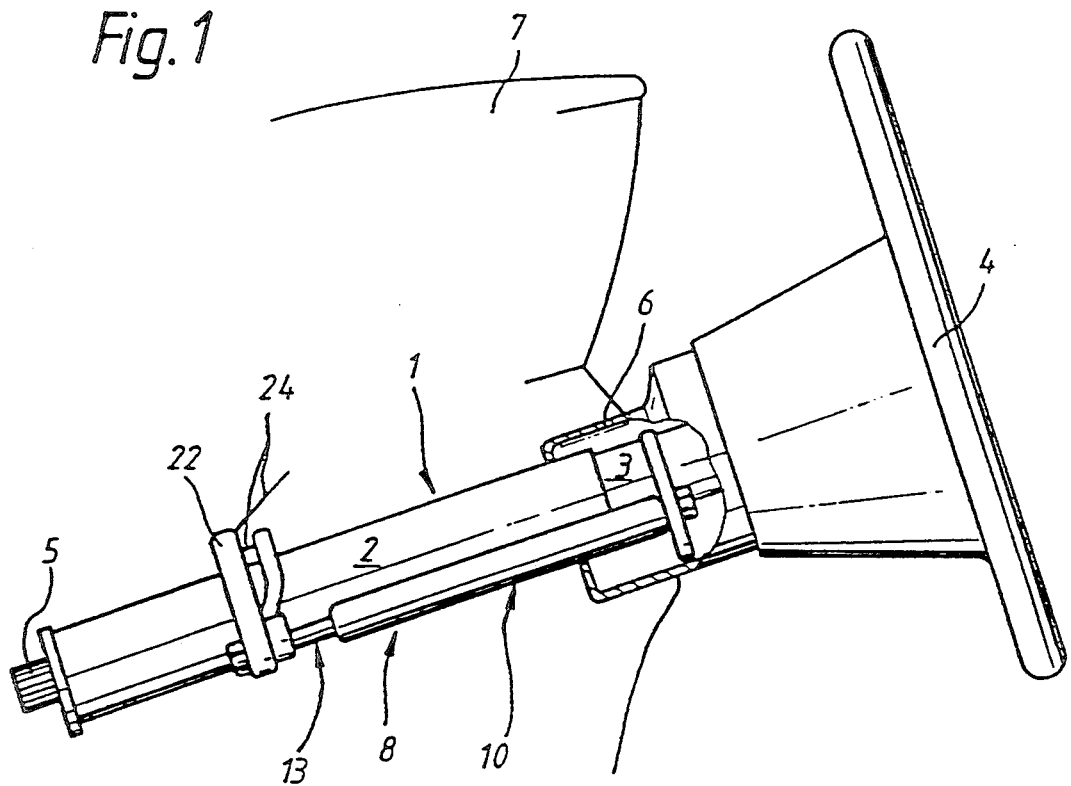
FIG. 1 is a schematic side view which shows a vehicle steering column with a steering wheel adjustable in the longitudinal direction, and constructed according to a preferred embodiment of the invention.
Figure 2:
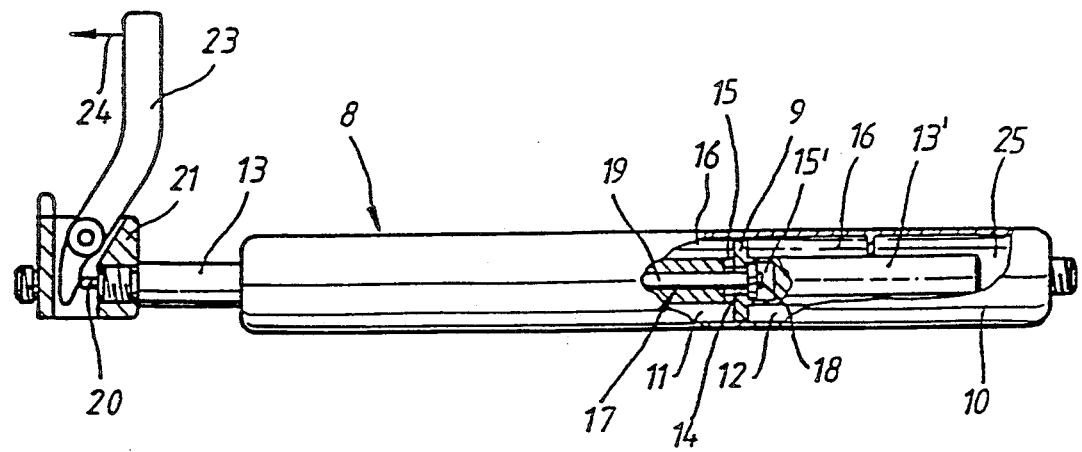
FIG. 2 is a schematic view which shows, in detail, a sealed hydraulic piston-cylinder unit used for locking the steering column of FIG. 1

FIG. 1 shows a vehicle steering column 1, which comprises a positionally fixed steering column part 2 and a displaceable steering column section 3. The steering column part 2 and the steering column section 3 are here formed by two jacket tube parts which can be pushed together like a telescope. Fixed at the end of the displaceable steering column section 3, on a steering spindle 5 extending centrally in the steering column 1, is a steering wheel 4, adjoining which is a cladding part 6 which also covers the transition of the displaceable steering column section 3 to the positionally fixed steering column part 2 in a dashboard 7. A hydraulic piston-cylinder unit 8, of which a piston 9 is fixed via a piston rod 13 to the positionally fixed steering column part 2 and of which the cylinder 10 is fixed to the displaceable steering column section 3, is arranged axially parallel to the steering column 1 to enable the adjustable steering column section 3 to be locked in a position, the height of which suits the driver of the vehicle.

On both sides of the piston 9, there are two fluid-filled, sealed cylinder chambers 11 and 12, through which a piston rod 13 and 13' respectively projects in each case centrally. The piston rod 13' serves to match the displacement volume and acceptance volume of the two cylinder chambers 11 and 12 to each other and, when it is displaced, protrudes into another cylinder chamber 25, which however is sealed off from the fluid-filled cylinder chamber 12. The piston 9 has a flow bore 14 which is connected to radial bores 15 and 15' in the piston rods 13 and 13', through which the working fluid 16 can flow from one cylinder chamber 11 into the other cylinder chamber 12 or in the other direction. The cylinder chambers 11 and 12 are otherwise sealed off fluid-tightly.

This flow facility can be blocked by a blocking device 17, which is here formed by a flow valve which comprises a valve disc 18 and a valve stem 19. With its diameter, the valve disc 18 covers the flow bore 14 and the valve stem 19 projects centrally through the piston rod 13 and protrudes beyond the latter with an end journal 20. The end of the piston rod 13 is first of all screwed into an actuating bush 21 and screwed by means of the latter to a flange 22 of the positionally fixed steering column part 2. Swivellably mounted in a free space of the actuating bush 21 there is furthermore an actuating lever 23 which, when a tensile force, which can, for example, be applied via a pull cable 24, acts on one end, presses with its other end on the end journal 20 of the valve stem 19 and displaces the latter within the piston rod 13 and in the process frees the flow bore 14. After this easily accomplished actuation, the piston 9 can thus be displaced in the cylinder 10, the working fluid 16 overflowing from one cylinder chamber 11 or 12 into the other cylinder chamber 12 or 11 respectively. The cylinder chamber 12 subjected to pressure when an impact on the steering wheel 4 occurs is here always completely filled with fluid. In order to achieve an adjustment of the steering column 1 in its longitudinal direction, it is accordingly merely necessary to swivel a mechanical actuating member 23, after which the locking produced by the piston 9 in the cylinder 10 is canceled.

Since the piston 9 in the cylinder 10 cannot travel an unlimited path, it is possible to use this limitation also for limiting the displacement path of the steering column section 3.

If the actuating lever 23 is swivelled back, the valve disc 18 closes the flow bore 14 in the piston 9 and the piston 9 now lies immovably fixed between the working fluid 16 in the two cylinder chambers 11 and 12. In this state, this hydraulic piston-cylinder unit 8 locks the displaceable steering column section 3 in its position relative to the positionally fixed steering column part 2.

Embodiments are also contemplated wherein the hydraulic linkage 8 and hence the piston 9 are formed by a jacket tube part 2 or 3 and the cylinder 10 by a further jacket tube part 3 or 2 respectively, overlapping the latter.

Although the invention has been described and illustrated in detail, it is to be clearly understood that the same is by way of illustration and example, and is not to be taken by way of limitation The spirit and scope of the present invention are to be limited only by the terms of the appended claims.

What is claimed:

1. Releasable locking device for a vehicle steering column adjustable in the longitudinal direction, having a positionally fixed steering column part, a steering column section displaceable relative to the latter and having at the end a steering wheel, a sealed hydraulic piston-cylinder unit arranged axially parallel to the steering column for fixing the displaceable steering column section and coupled between and outside the positionally fixed steering column part and the displaceable steering column section, and a mechanical actuating member for controlling the displaceable steering column section, wherein the sealed piston-cylinder unit, with a cylinder chamber which, when completely filled and subjected to pressure caused by impact on the steering wheel, can be locked in various supporting positions by a blocking device arranged in an overflow path between two cylinder chambers of the piston-cylinder unit.

2. Releasable locking device according to claim 1, wherein the two cylinder chambers are configured such that, when the piston is displaced in the cylinder, the overflow volume from one cylinder chamber corresponds to the acceptance volume of the other cylinder chamber.

3. Releasable locking device according to claim 1, wherein a valve stem projects through the piston and is displaceable by the mechanical actuating member, and a valve disc fixed on said valve stem covers a flow bore in the piston.

4. Releasable locking device according to claim 1, wherein the displacement path of the steering column section is limited by the piston displacement in the cylinder.

5. Releasable locking device according to claim 2, wherein the displacement path of the steering column section is limited by the piston displacement in the cylinder.

* * * * *